Jan. 11, 1949.　　　　J. F. BYRNE　　　　2,458,830
MODULATION INDICATOR
Filed May 23, 1945
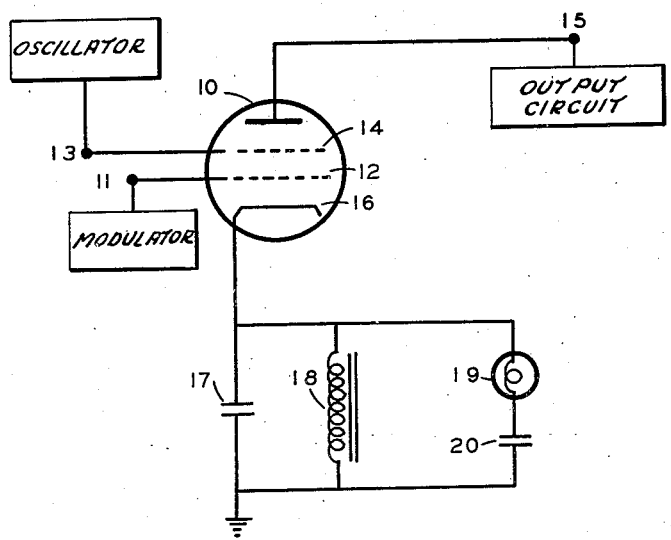
INVENTOR.
JOHN F. BYRNE
BY
ATTORNEY Patented Jan. 11, 1949

2,458,830

UNITED STATES PATENT OFFICE 2,458,830

MODULATION INDICATOR

John F. Byrne, Wellesley Hills, Mass., assignor to the United States of America as represented by the Secretary of War Application May 23, 1945, Serial No. 595,356

1 Claim. (Cl. 332—20)

This invention relates to radio circuits and more specifically to circuits for qualitatively determining the amplitude of the modulation voltage impressed on an oscillating radio frequency voltage whether the modulation voltage be in the form of a sine wave, or pulse, or of aperiodic and irregular variation.

Apparatus used in the prior art for determining the amplitude of the modulation voltage or the percent of modulation present on a carrier wave has included expensive and complicated apparatus requiring delicate adjustments and close attention by the operator thereof.

In many cases it is desirable that an operator of a transmitter be able to ascertain in a general way the degree of modulation of the transmitted carrier wave without being disturbed in his main duty of operating the transmitter. In such cases an accurate determination of the modulation voltage is not necessary but only an indication that the modulation voltage is maximum for the operating conditions.

It is an object of the present invention to provide means for qualitatively determining the amount of modulation voltage by simple, rugged, inexpensive apparatus which requires no adjustment and which operates satisfactorily over a wide range of frequencies.

It is desirable that the indication of modulation voltage be as near the output of the apparatus as possible. The nearer the point of measurement is made to the output the greater the assurance that it represents the modulated voltage at the output. However, in order to determine the modulated voltage after modulations have been mixed with the carrier it is necessary to separate the two voltages by detecting apparatus before the modulation voltage can be measured. The use of detecting circuits increases the complication of the apparatus and such circuits are difficult to arrange without seriously interfering with the output of the transmitter.

Measurement of modulation voltage by coupling measuring circuits to the antenna has similar disadvantages, in addition to which, if such circuits are closely associated with the antenna, they will decrease the output of the transmitter and cause serious and erratic distortional effects on the antenna pattern. If placed at such a distance from the antenna that none of these effects are present, it would be necessary to have complete and independent apparatus of added complications.

Modulation indicating instruments of the prior art forming a component part of the transmitter itself generally have not included detecting circuits and have indicated the output voltage of a modulator tube prior to the introduction of modulations into a power amplifier tube where they are mixed with the oscillator output to produce the modulated carrier wave. One advantage of the present invention is that the modulation voltage is measured in the cathode of the power amplifier tube in which it is mixed with the oscillator output. This point is the last place in the transmitter where that measurement can be made without the use of complicated detecting circuits.

It is obvious that the present invention is of especial use in remotely controlled transmitters as the indicator is adaptable to being placed in the remote control apparatus.

Other objects, features, and advantages of the invention will suggest themselves to those skilled in the art and will become apparent from the following description of the invention taken in connection with the accompanying drawing which is a circuit diagram of the indicating device of this invention.

Referring to the drawing, 10 is a power amplifier tube. Since this tube and its operating circuits are of well known conventional design, the only circuits shown in the drawing are those essential to an understanding of the invention. The output of a modulator is fed from terminal 11 of the modulator to grid 12 of the power amplifier tube 10 and the output of an oscillator is fed from the terminal 13 of the oscillator to grid 14. The output of tube 10 after passing through appropriate circuits is designated by terminal 15.

Between cathode 16 and ground are three parallel branches, one having condenser 17 in circuit, the second having inductance 18 in circuit, and the third having indicating light 19 and condenser 20 in series. Light 19 is preferably a low voltage, low current incandescent light bulb. The value of condenser 17 is chosen to offer negligible impedance to all frequencies above the modulation frequency, and, therefore, condenser 17 by-passes them to ground. The value of inductance 18 is chosen to be low at the modulation frequency relative to the impedance of condenser 17 at that frequency.

The voltage on cathode 16 of tube 10 will vary in accordance with the oscillator frequency, modulation frequency, modulated carrier frequency, and combinations of those frequencies and their harmonics. All of these components except those of the modulation frequency are by-passed to ground through condenser 17 but the modulation current flows to ground through inductance 18 causing a voltage drop across it. This voltage drop is indicated by light bulb 19. Since the light bulb 19 is an incandescent bulb the intensity of its light is dependent upon the voltage applied across it. This is proportional to the modulation voltage impressed on grid 12. Condenser 20 protects light bulb 19 against a direct current potential and prevents any direct current flowing through the light bulb 19 which would cause an effect on the bias of the cathode 16. Since inductance 18 is a very low resistance to direct current, the direct current does not cause an appreciable voltage drop across inductance 18.

In designing the circuit for a given transmitter, circuit constants are chosen so that for normal operation the light bulb 19 has a standard intensity of illumination well within the operating limits of the light. One operating the transmitter and becoming acquainted with this normal intensity can immediately detect any loss or gain of modulation by a change in that intensity.

It is seen that the indication given by the intensity of illumination of light bulb 19 is in direct relation to the applied modulation voltage and that the method of disposing of the radio frequency and direct current components is unique in its application and that the modulated output is in no way increased, decreased, distorted or otherwise affected by the use of the invention.

The circuit of this invention may be used regardless of the type of modulation.

While there has been here described what is at present considered to be the preferred embodiment of the invention, it will be obvious to those skilled in the art that various changes and modifications may be made without departing from the scope of the invention.

What is claimed is:

In a radio transmitter wherein a modulation voltage and a carrier frequency voltage are mixed in an electronic tube having at least cathode, grid and plate electrodes, and a cathode circuit therefor, a modulation voltage indicating circuit comprising an incandescent light and a condenser connected in series with respect to each other and in parallel to an inductance and a second condenser, said inductance and said second condenser being connected in parallel to said cathode circuit, said inductance having a low impedance to modulation frequencies, said second condenser having a high impedance to modulation frequencies and a negligible impedance to all the higher frequencies, said inductance and said condensers acting to prevent the passage of any current through said incandescent light except a current varying in accordance with the modulation voltage, whereby the intensity of illumination of said incandescent light is an indication of the modulation voltage.

JOHN F. BYRNE.

REFERENCES CITED

The following references are of record in the file of this patent:

UNITED STATES PATENTS

| Number | Name | Date |
| --- | --- | --- |
| 1,228,065 | Seibt | May 29, 1917 |
| 1,671,467 | Davis | May 29, 1928 |
| 1,690,704 | Schaffer | Nov. 6, 1928 |
| 2,159,240 | Wheeler | May 23, 1939 |
| 2,278,159 | Wheeler | Mar. 31, 1942 |

OTHER REFERENCES

Article, "A simple modulation meter," by J. G. Lowell Foot, pages 216–217, Scientific Instruments, vol. 12, 1935.

Publication, Radio Engineering Handbook, by Terman, published by McGraw-Hill Co., New York, New York, 1943, pages 563–564. Copy in Division 51.